United States Patent [19]

Feistel

[11] E Re. 30,957

[45] Reissued Jun. 1, 1982

[54] VARIANT KEY MATRIX CIPHER SYSTEM

[75] Inventor: Horst Feistel, Lexington, Mass.

[73] Assignee: International Business Machines Corporation, Armonk, N.Y.

[21] Appl. No.: 164,402

[22] Filed: Jun. 30, 1980

Related U.S. Patent Documents

Reissue of:

[64] Patent No.: 4,195,196
Issued: Mar. 25, 1980
Appl. No.: 406,728
Filed: Oct. 15, 1973

[51] Int. Cl.[3] ..... H04L 9/00

[52] U.S. Cl. ..... 178/22.17; 178/22.19

[58] Field of Search ..... 375/2; 178/22.17, 22.19; 364/717

[56] References Cited

U.S. PATENT DOCUMENTS

| | | | |
|---|---|---|---|
| 3,557,307 | 1/1971 | Florin et al. | 178/22 |
| 3,624,610 | 11/1971 | Warring | 178/22 |
| 3,657,699 | 4/1972 | Rocher | 178/22 |
| 3,681,708 | 8/1972 | Olmstead | 178/22 |
| 3,700,806 | 10/1972 | Vasseur | 178/22 |
| 3,740,475 | 6/1973 | Ehrat | 178/22 |
| 3,781,472 | 12/1973 | Goode et al. | 178/22 |
| 3,798,359 | 3/1974 | Feistel | 178/22 |
| 4,181,816 | 1/1980 | Vasseur | 178/22 |

*Primary Examiner*—Howard A. Birmiel
*Attorney, Agent, or Firm*—Roy R. Schlemmer, Jr.

[57] ABSTRACT

This is a cipher system for enciphering a stream of binary data by means of a product cipher. A clear message represented in a binary data format is transformed into a cipher message by operating on each bit of clear information with a complex modulo-two addition function. This function is dependent on previous internal cipher digits transmitted and varies for each message bit processed. The function is developed by continually shifting a key matrix under the control of a varying control matrix. The control matrix is formed from the sub-product of the complex function developed in generating each cipher bit.

11 Claims, 12 Drawing Figures

| | | |
|---|---|---|
| FIG. 2A | FIG. 2B | FIG. 2C |
| FIG. 2D | FIG. 2E | FIG. 2F |

VARIANT KEY MATRIX CIPHER SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

Reference is hereby made to application Ser. No.: 158,360, entitled "Block Cipher Cryptographic System," and application Ser. No.: 158,174, entitled "Step Code Ciphering System" both filed on June 30, 1971 and to application Ser. No.: 194,836, entitled "Recirculating Block Cipher Cryptographic System," filed Nov. 2, 1971, all assigned to the same assignee as the present application.

BACKGROUND OF THE INVENTION

With the growing use of remote-access computer networks which provide a large number of subscribers with access to "data banks" for receiving, storing, processing and furnishing information of a confidential nature, the need for data security has increased significantly. Generally, present-day computing centers have elaborate procedures for maintaining physical security at the location where the central processor and data-storage facilities are located. For example, some of the procedures which have been used are: restriction of personnel within the computer center, utilization of mechanical keys for activation of equipment, and camera observation. These security procedures, while providing a measure of safety in keeping unauthorized individuals from the physical computing center itself, are not effective with respect to large remote-access computer networks which have many terminals located at distant sites, connected to the central processor by either cable or telecommunication lines.

Some digital techniques have been implemented in computing systems for the purpose of maintaining privacy of data. One such approach is the use of a device generally known as "memory protection." This type of data security technique associates a unique binary key with selected segments of the storage within the central processor. Then, internal to the processor, there are present various protection circuits that check for a match of the binary key during the operation of executable instructions and access to sections of storage. This type of security measure is generally ineffective in protecting information within the computing system from unauthorized individuals who have knowledge of the computing system circuitry, and who can devise sophisticated programming techniques for illegally obtaining unauthorized data.

In the field of communications, cryptography has long been recognized as a means for achieving security and privacy. Many systems have been developed in the prior art for encrypting messages for maintaining secrecy of communications. For example, one well-known technique which has been used for generating "ciphertext" from "cleartext" messages is of substitution. In systems which utilize substitution, letters or symbols that comprise the clear message are replaced by some other symbols in accordance with a predetermined "key." The resulting substituted message is a cipher which is expected to be secret and hopefully can not be understood without the knowledge of the secret key. A particular advantage of substitution in accordance with a prescribed key is that the deciphering operation is easily implemented by reverse application of the key. A common implementation of substitution techniques may be found in ciphering-wheel devices, for example, those disclosed in U.S. Pat. Nos. 2,964,856 and 2,984,700, filed Mar. 10, 1941 and Sept. 22, 1944 respectively.

Further teachings on the design principles of more advanced substitution techniques may be found in "Communication Theory of Secrecy Devices" by C. E. Shannon, Bell System Technical Journal, Vol. 28, Pages 656–715, October 1949. Shannon, in his paper, presents further developments in the art of cryptography for expounding the product cipher, that is, the successive application of two or more distinctly different kinds of message-symbol transformations. One example of a product cipher consists of a symbol substitution followed by a symbol transposition.

Another well-known technique for enciphering a clear message communication is the use of a stream-generator sequence which is utilized to form a modulo sum with the symbols that comprise the clear message. The cipher output message stream formed by the modulo sum would then be unintelligible to the receiver of the message, if it does not have knowledge of the stream-generator sequence. Examples of such stream-generators may be found in U.S. Pat. Nos. 3,250,855 and 3,364,308, filed May 23, 1962 and Jan. 23, 1963, respectively.

Various ciphering systems have been developed in the prior art for rearranging communication data in some ordered way to provide secrecy. For example, U.S. Pat. No. 3,522,374 filed June 12, 1967 teaches the processing of a clear message with a key-material generator that controls the number of cycles for enciphering and deciphering. Related to this patent is U.S. Pat. No. 3,506,783 filed June 12, 1967 which discloses the means for generating the key-material which gives a very long pseudo-random sequence. Another approach which has been utilized in the prior art for establishing secret communications is the coding of the messages electrical signal representations that are transmitted over the communications channel. This type of technique is usually more useful in preventing jamming rather than in preventing a cryptanalyst from understanding a cipher message. Exemplary systems of this type may be found in U.S. Pat. Nos. 3,411,089, filed June 28, 1962 and 3,188,390, filed June 8, 1965.

In the area of computer data communications, it has generally been found that product ciphers are superior to other types of ciphering schemes, as discussed in "Cryptography and Computer Privacy" by H. Fesitel, Scientific American, Volume 228, No. 5, May 1973, pp. 15–23. Examples of product ciphering systems are disclosed in co-pending patent applications Ser. Nos. 158,369; 158,174 and 194,836. These patent applications present systems for generating a product cipher under the control of the unique user key. With careful selection of the size of the data block size and the key size, the probability of ever cracking the cipher becomes extremely small. That is, a cipher becomes impractical to crack by trial of all possible combinations of the key. This is particularly true if the cipher text reveals no information with regard to the unique user key.

The systems disclosed in the above referenced co-pending patent applications are extremely useful in providing secure communications. However, these systems impose a requirement as to a specific message size. Generally, most product block ciphers are restricted to a specific message vector. Thus, if it is desired to transmit a small number of bits of information, it is necessary to "pad" the information with extraneous data in order to form the proper size message block.

OBJECTS OF THE INVENTION

Therefore, it is an object of this invention to provide a cryptographic system which operates with a variant key which changes for each digit of message information that is processed.

It is another object of the present invention to provide a cryptographic system in which the ciphering key is successively varied as a function of the message cipher output.

It is further object of the present invention to provide a cryptographic system in which the cipher key is arranged in a matrix in which the columns or rows are rearranged after each cipher operation as a function of the cipher text generated from operating on the previous message.

SUMMARY OF THE INVENTION

In accordance with this invention, a variant key matrix cipher system is provided which permits the ciphering of long streams of binary data without need for segmenting the stream into predesignated blocks. The system is first initialized with a primer message that is obtained from a random binary source. This random binary source is introduced into the system for the purpose of initializing the key matrix. The initialization operation is performed at the transmitter in such a manner so as to permit the receiver to duplicate it, step by step, upon receipt of the cipher digits.

Subsequent to the initialization with the primer, message binary information is introduced into the system for ciphering. The variant key is changed for each bit of message information that is processed. That is, the system operates serially on the message information, bit by bit. A plurality of cascaded modulo-two adders are utilized for the purpose of applying the cipher key to the input message. The intermediate products within the plurality of cascaded modulo-two adders are used in a feedback fashion to cause a variation of the key matrix prior to processing the next bit of message information. In addition to the variation of the key matrix caused by the feedback from the modulo-two adders, a further variance on the key is created by substituting a column within the matrix with a binary word that is generated as a function of a non-affine transformation of the binary word that is input into the modulo-two adders. The cipher or decipher output is taken from a single stage of the cascaded modulo-two adders. Both the transmitter and receiver cipher-decipher units operate in exactly the same manner.

DETAILED DESCRIPTION OF THE INVENTION

In the art of cryptography there are several classical types of ciphering systems. One of these types is the well-known "key interrupted Vigenere" addition cipher. Assuming for example, that a typical message to be transmitted is, M=21223131311213, and the addition key is 123, i.e., of period 3. Then, a typical addition cipherment would be as follows:

$$\begin{array}{rl} M = & 212231311213 \\ K = & \underline{123123123123} \\ C = & 335354434336 \quad ; C = M + K \text{ (mod 6)} \end{array}$$

From observation of this cipher, C, it is apparent that there is a need for a repeated periodic reuse of the addition key K. This observation, by those skilled in the art of cryptography has resulted in various analyses of the Vigenere and other periodic ciphers. In the prior art, many attempts have been made to combine the convenience of the use of a short fixed key for even fairly long messages by obfuscating the invariances that use of the key introduces. This has been done through various attempts to stimulate a non-periodic distribution of the key, K.

Assuming for example, that correspondants communicating with each other through a cipher system agree to use the message letter "1" as an indicator which informs the receiver to discontinue the encipherment for the following cleartext letters and that to use the next key as prescribed by the periodic function of the key. Instead, the key is used in a repeated fashion starting with the beginning letter. Considering the previous example, if the message letter "1" happens to be the indicator, the encipherment with this new interrupt feature would result in the following cipher.

$$\begin{array}{rl} M = & 2122311213 \\ K = & \underline{1\bar{1}231\bar{1}1\bar{2}\bar{1}2} \\ C = & 3245422425 \end{array}$$

The indicators are shown in the above example as being underlines. It should be noted that the periodicity of the key has been interrupted by the non-periodic appearances of the indicator "1" in the message M.

While the above ciphering process is an improvement over the ordinary Vigenere, it still contains some weaknesses and is susceptible to analysis. A much "stronger" cipher may be obtained by instead of interrupting the single periodic key, using a key matrix which is a complex function of the message being ciphered. This would present a set of keys rather than a single interrupted key. These set of keys may be represented in the form of a matrix which is of suitable size. It should be noted for the purpose of understanding the invention described herein that whenever the term suitable size is used, it is generally meant that the size is sufficiently large such that using ordinary probability theory it would be impractical for an opponent to attempt all possibilities in order to guess the unique combination of binary digits which represent the key. For example, a matrix of dimension $128 \times 16$ would be sufficiently large to avoid trial and error determination of the key.

Figure 1:
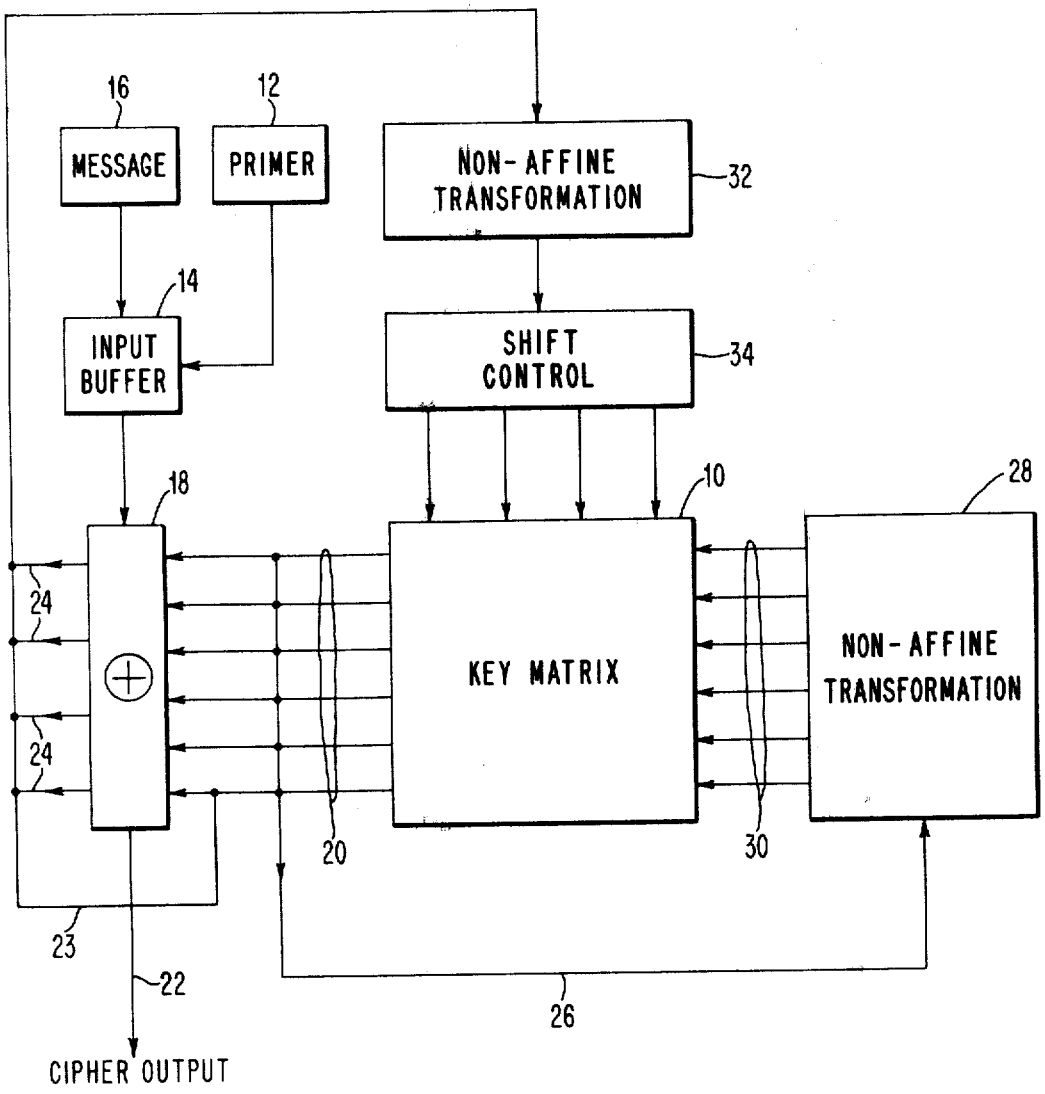
FIG. 1 is a block diagram of the cryptographic system.

Referring now to FIG. 1, there is shown a block diagram representation of a variant key matrix cipher system. Initially, the system is "unprimed." That is, key matrix 10 contains an initial key which is stored in the matrix element positions. In order to begin operating the cipher system, it is necessary to prime such system by introducing a random number from primer 12 into the system for modifying the fixed cipher key within key matrix 10. Primer 12 consists of a random number generator of conventional type which are well known in the art. The random number is sequentially introduced into input buffer 14 for input into the cipher system. The random number that is output by primer 12 is of sufficent length to cause the entire key to be varied as a function of the random number. The input buffer 14 serves the function storing the digital information received from either primer 12 or message source 16. Furthermore, input buffer 14 shifts this information into the modulo-two adder 18.

During initialization of the system, the primer 12 feeds a sequence of random digital information to the input buffer 14 which in turn passes the random information into adder 18. At the modulo-two adder 18, a modulo-two addition is performed on the random binary digits and the information contained in selected elements of the key matrix. For example, the left-most elements of the first column in the key matrix 10 are introduced into the modulo-two adder by lines 20. Then, within modulo-two adder 18, a modulo-two addition is performed successively by a set of cascaded single-bit modulo-two additions with each matrix element and the respective outputs of each of the modulo-two adders contained in adder 18. The output of the modulo-two addition is presented on line 22, which output represents the cipher message output.

As an intermediate product of the modulo-two addition performed by modulo-two adder 18, lines 24 and line 23 are used as feedback control for rearranging or scrambling the elements in the key matrix 10. Simultaneous with introduction of the key on lines 20, digital information is fed back along line 26 to non-affine transformation device 28. Feedback line 26 contains an N-bit word which represents the digital information that was introduced into the modulo-two adder 18 along lines 20. This N-bit word is reintroduced into selected elements of the key matrix 10 after transforming the N-bit word through a non-affine transformation device 28. The non-affine transformation may be performed by a substitution function. Exemplary techniques for generating substitutions may be found in the above cross-referenced patent applications. The transformed N-bit number which is the output of non-affine transformation device 28 appears on lines 30 and is introduced into the key matrix 10 at selected memory elements. The introduction of the transformed N-bit number is performed by respectively placing one digit in each of the rows from which information was taken during the transmitting of information on lines 20 to modulo-two adder 18. Thus, there is achieved a conservation of information in the sense that for each binary digit taken out of the key matrix, another binary digit is replaced into the key matrix. After having placed the transformed N-bit number in the matrix 10, which for example, may take the form of loading the right-most column in the matrix with the N-bit transformed number, the system is now ready for a matrix operation.

As was mentioned previously, the information contained on feedback lines 24 is fed back in some form to the key matrix 10. The binary information appearing on lines 24 is introduced into a non-affine transformation device 32 for the purpose of creating a P-bit word which is then used by shift control 34 to control the rearrangement of the elements in the matrix. An exemplary transformation is the circulation of each of the rows in the key matrix 10 in accordance with a binary number represented by information contained in the shift control 34. After the matrix transformation operation is executed, the key matrix is now in a form which permits the repetition of all of the above steps with a variant key contained in key matrix 10. When the primer 12 has been exhausted and message information from message source 16 is introduced into the input buffer 14.

During the priming operation at the transmitter station, the cipher output is sent a receiving station, where a decipher operation is performed so that subsequent messages may be de-ciphered with an identical key as is used by the transmitter station. The primer source 12 which represents a key element in the system, and the key in the key matrix 10 must be maintained secure. That is, they must not be able to be accessed in any manner by individuals using the system. These security aspects of primer 12 and matrix 10 may be achieved by using appropriate seals, circuits which self-destruct upon tampering, or other well known means.

Reference should now be made to FIGS. 2A, 2B, 2C, 2D, 2E and 2F where there is shown a detailed schematic diagram of the cryptographic system. FIGS. 2A–2F may be arranged in the manner shown in FIG. 2. For the purpose of simplicity and ease of understanding the invention disclosed herein, the various elements in the cryptographic system have been shown in a reduced size. That is, the size of the key matrix 10 is substantially smaller than that which would be required in a working system. However, it should be noted that the enlargement of the size of the key matrix 10 does not alter any of the principles taught herein but would make the understanding of the invention much more difficult due to the sheer increase of the number of elements in the system with their interconnecting lines.

Figures 2, 2A:
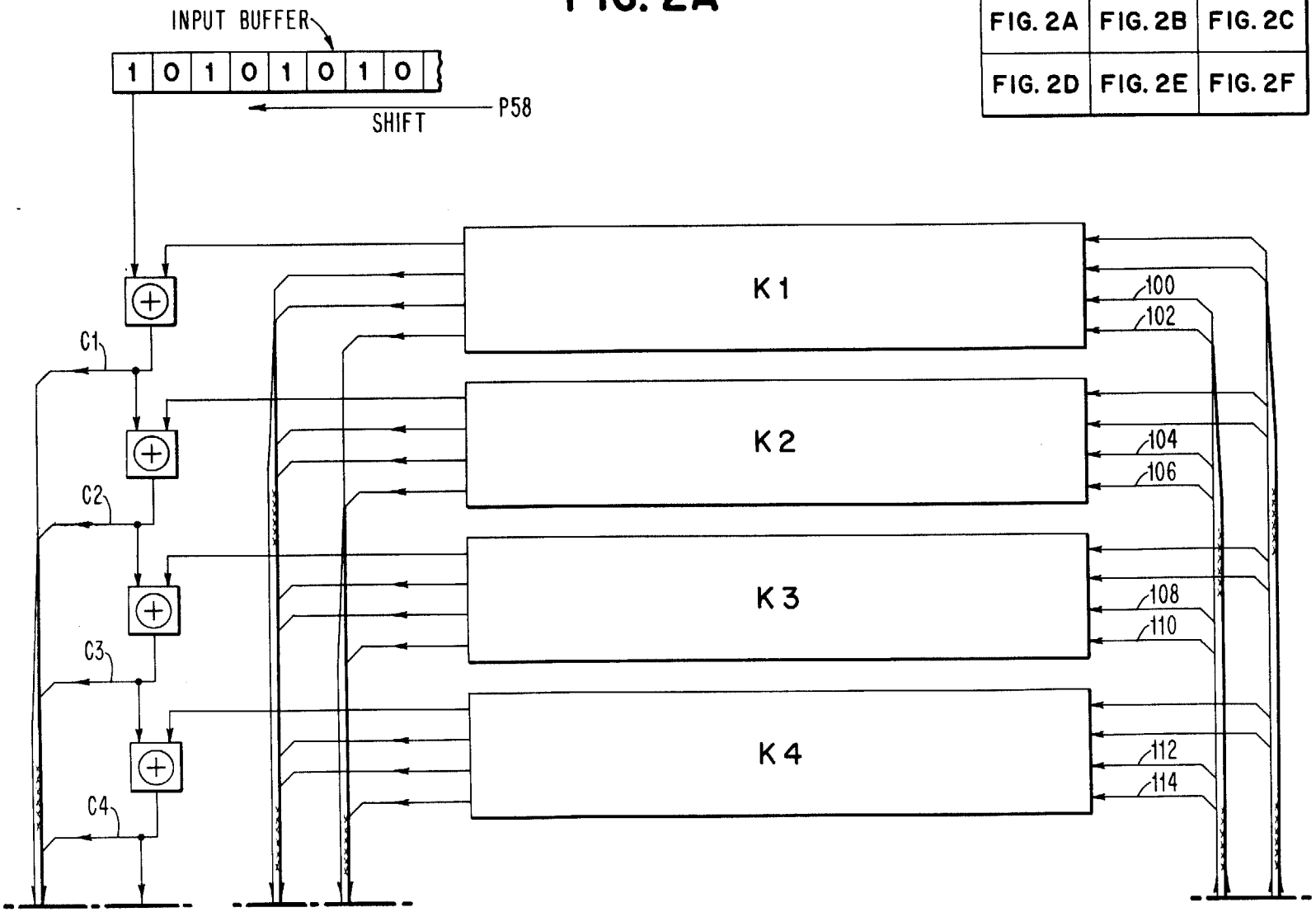
FIGS. 2A, 2B, 2C, 2D, 2E and 2F are a schematic diagram of the cryptographic system shown in FIG. 1.
Figure 2B:
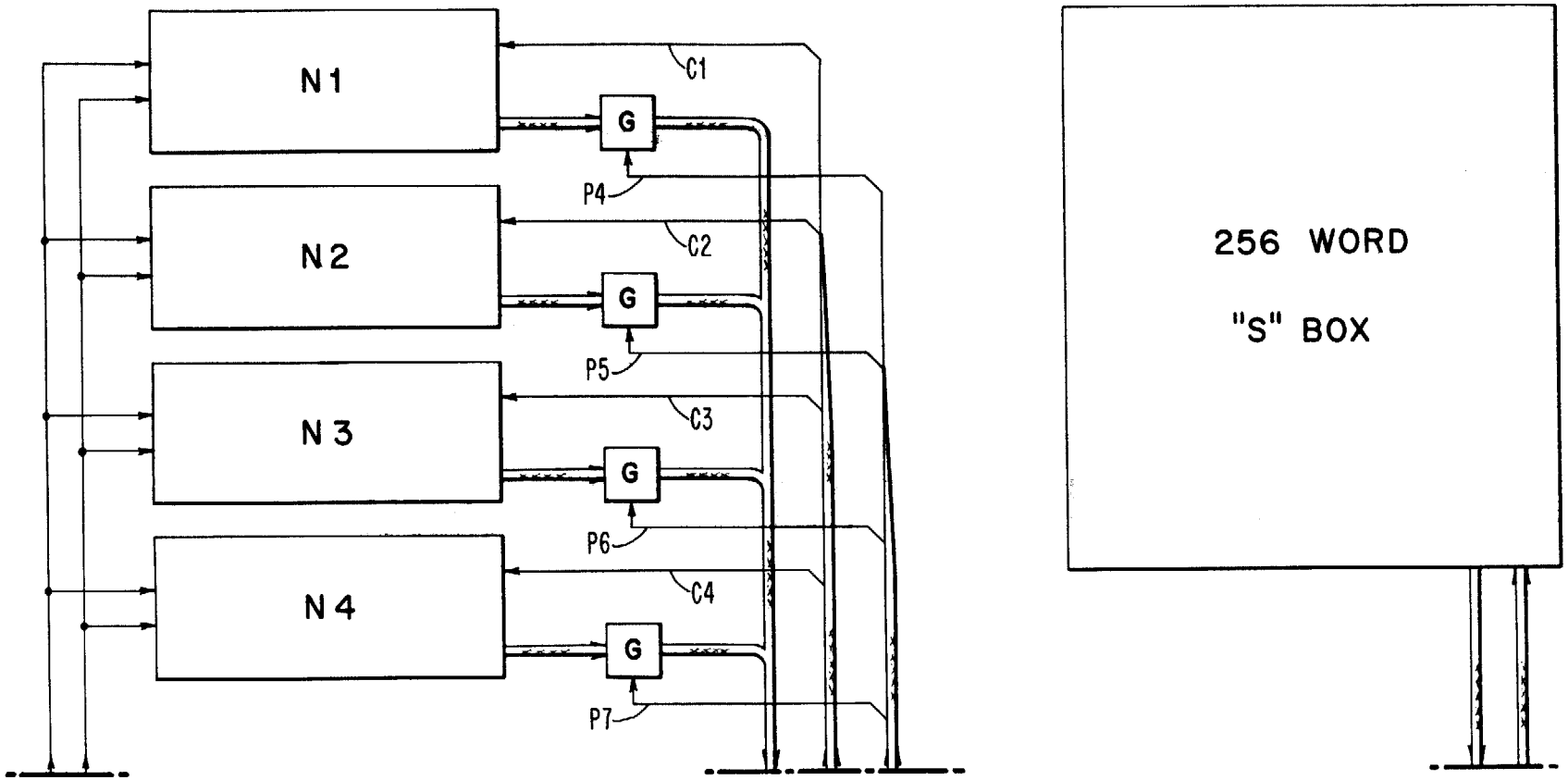
Figure 3:
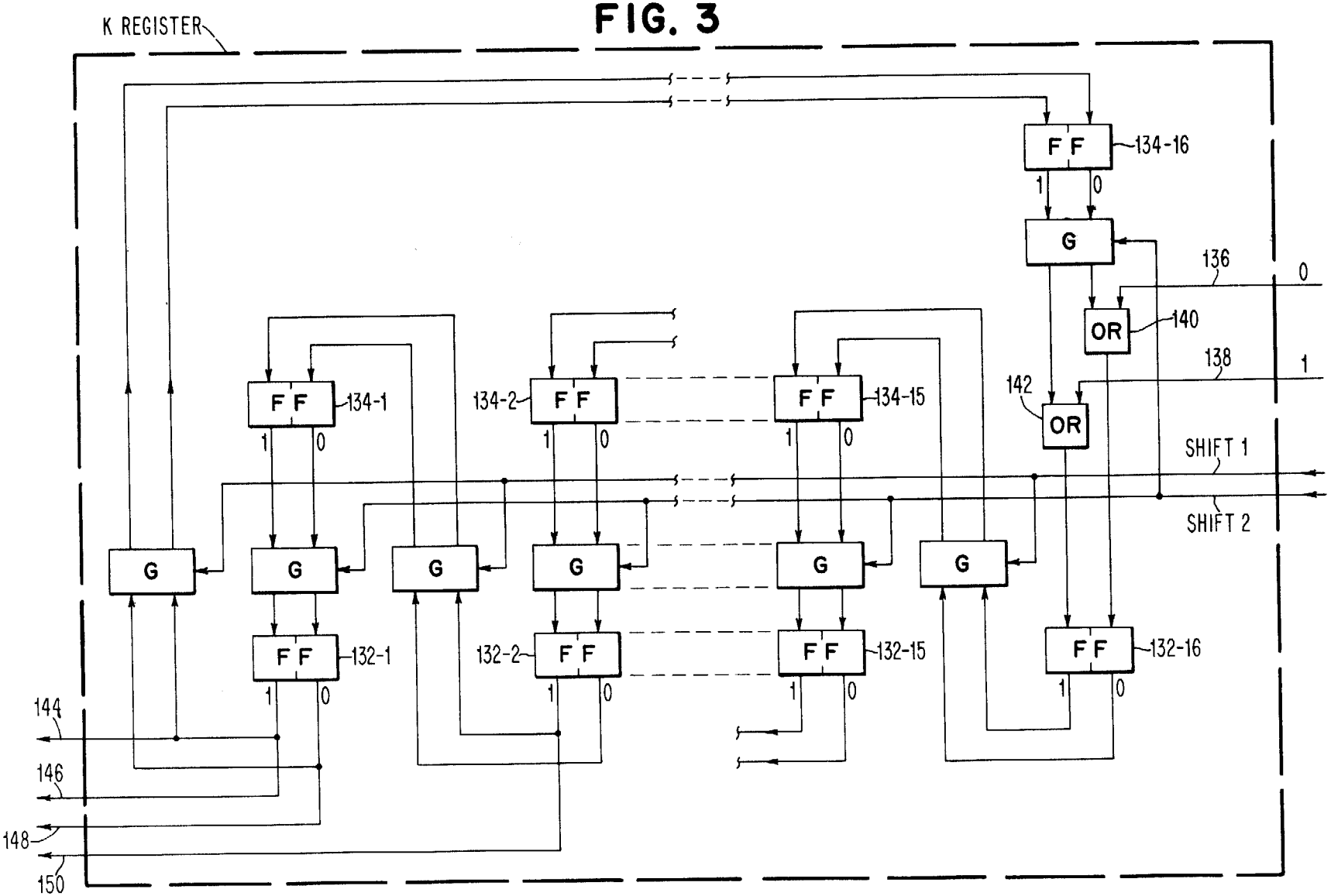
FIG. 3 is a schematic diagram of one of the K registers shown in FIG. 2D.

The key matrix 10 is represented in FIG. 2 as being formed by eight shift registers. Each of these registers which are designated by the labels K1 through K8 are identical and are represented in further detail in FIG. 3. Referring to FIG. 3, there is shown the structure of an exemplary K register. For the purpose of describing the system in its contracted form, it is assumed that each K register is 16 bits long. The digital information in the K register is contained in flip-flops 132-1, 132-2, . . . , 132-15, 132-16. Each of the K shift registers is a "double rank" shift register with intermediate storage being provided by the flip-flops labeled 134-1, 134-2, . . . , 134-15, 134-16. In order to exercise the K register, two shift pulses are required. These two shift pulses are provided on lines labeled "shift 1" and "shift 2" as shown in FIG. 3. When a pulse is applied to a line labeled "shift 1," the information contained in flip-flop 132-1 is transferred to flip-flop 134-16. Similarly, the information contained in flip-flop 132-2 is transferred to flip-flop 134-1 and the information contained in flip-flop 132-16 is transferred to flip-flop 134-15. When a pulse appears on the line labeled "shift 2," the information contained in flip-flop 134-16 is transferred to 132-16. Similarly, the information contained in flip-flop 134-15 is transferred to flip-flop 132-15 and the information in flip-flop 134-2 is transferred to flip-flop 132-2 and the information in flip-flop 134-1 is transferred to flip-flop 132-1. In this manner, a shift of one position to the left is accomplished. The digital information in flip-flop 132-16 may be changed by applying an input to either one of lines 136 or 138. These inputs can extend through either one of OR circuits 140 or 142 to flip-flop 132-16. Thus, the right-most column represented by the right-most bit in the K registers of FIG. 2 may be changed. In FIG. 3, it should be noted that the information contained in flip-flop 132-1 and 132-2 extend to the left on lines 144, 146, 148 and 150. These lines extend to circuitry which is described at a further point in this specification.

Now having discussed the operation of one of the K registers in the key matrix 10, attention is now given to the cipher key variation. As indicated with regard to FIG. 1, the key matrix has initial key and during the priming operation, a random message is introduced into the system for the purpose of varying the cipher key, which would result in a change and rearrangement of binary "0's" or "1's," contained in elements of the key matrix 10. As discussed previously, this cipher key is variant and continually changing as a function of the cipher message output.

The continually changing cipher key is varied for each single bit of information, be it primer or message. Referring to FIG. 2, there is shown a cable 165 eminating from the left-most side of the K registers the binary word presented along cable 165 is made to undergo a non-affine transformation and the transformed binary word is than loaded into the right-most column of the K matrix, or in other words, the right-most bit in each of the K registers is loaded with the respective bit from the transformed binary word.

Simultaneous with the generation of the cipher key shift control 34 operates in such a manner as to rearrange the elements of the key matrix 10. The shift control 34 receives as input a non-affine transformed binary word derived from the intermediate cipher products of the modulo-two adder 18 and rearranges the elements in the key matrix 10 by circulating the information contained in each of the K registers K1–K8. The P-bit binary word which is input into the non-affine transformation device 32 is derived from a plurality of registers identified as N1, N2, N3, N4, N5, N6, N7 and N8. Each of these registers respectively interact with the modulo-two addition relating to the respective K register left-most bit position.

Figure 4:
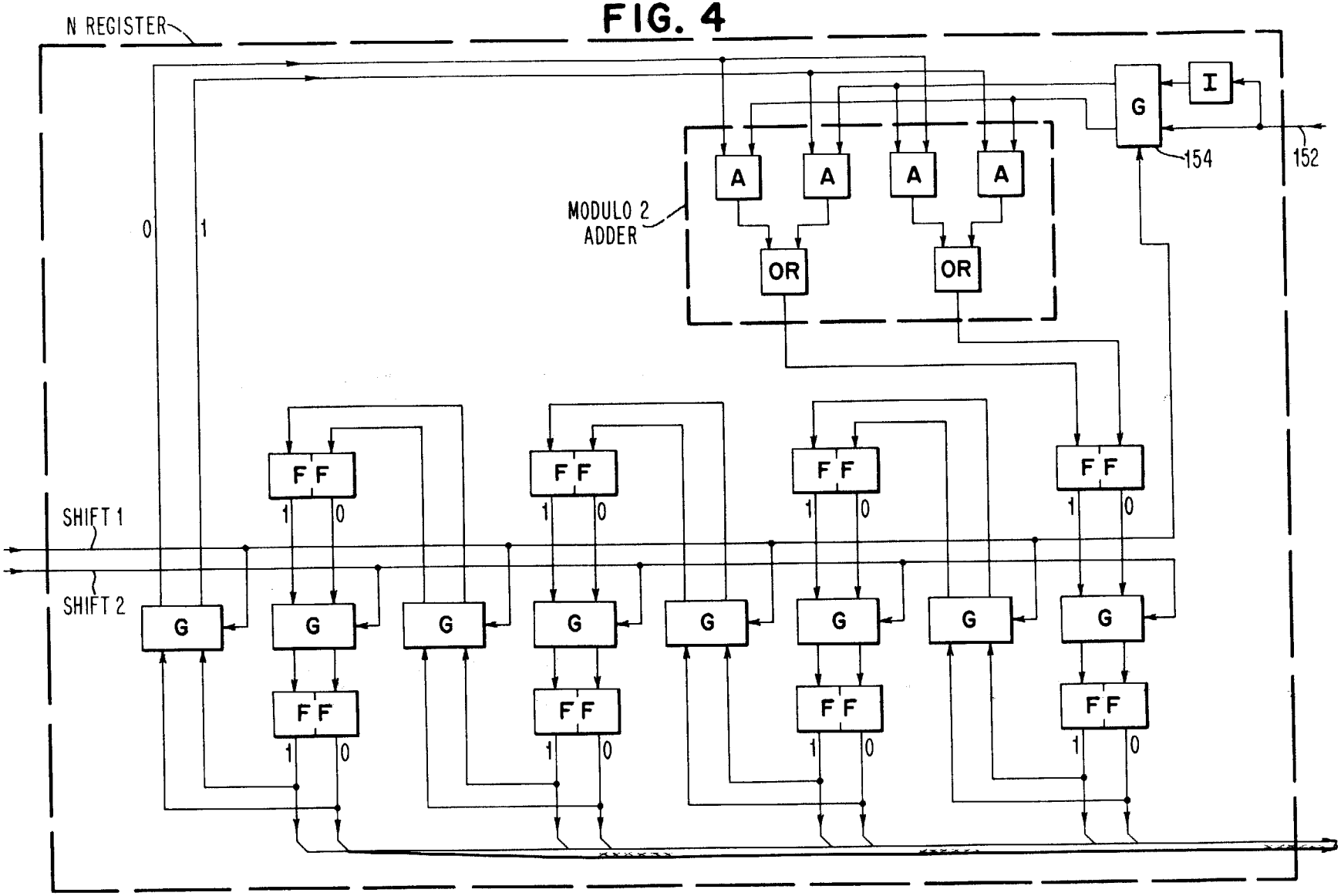
FIG. 4 is a schematic diagram of one of the N registers shown in FIG. 2.

Now referring to FIG. 4, there is shown a detailed schematic diagram of one of the N registers. It should be noted, that each of the N registers are identical. The N register is quite similar to the K register shown in FIG. 3 except that it only contains 4-bit positions. Except for its limited size, the operation of the N register is identical with that of the K register. Accordingly, a repetition of such operation will not be presented herein.

As input to the N register, there is a line 152 which presents information that is added, modulo-two, to the contents of the left-most flip-flop of the N register. This addition takes place whenever a pulse is applied to the "shift 1" line. When the line labeled "shift 1" is activated, gate 154 is also activated and permits the modulo-two addition to take place. The result of this modulo-two addition is then entered into the right-most flip-flop of the N register when a pulse is applied to the "shift 2" line.

Figure 5:
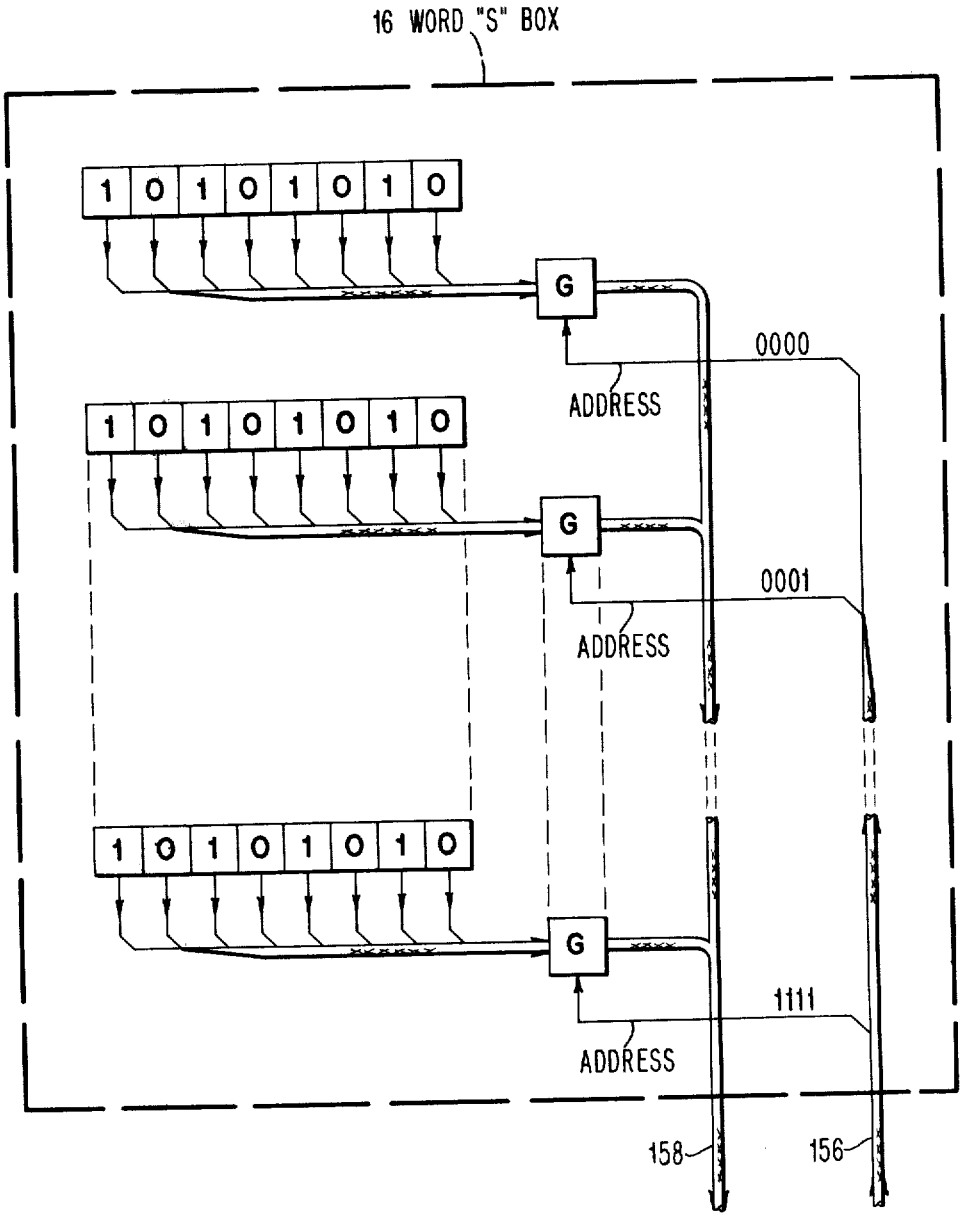
FIG. 5 is a schematic diagram of the 16 word "S box" shown in FIG. 2.
Figure 6:
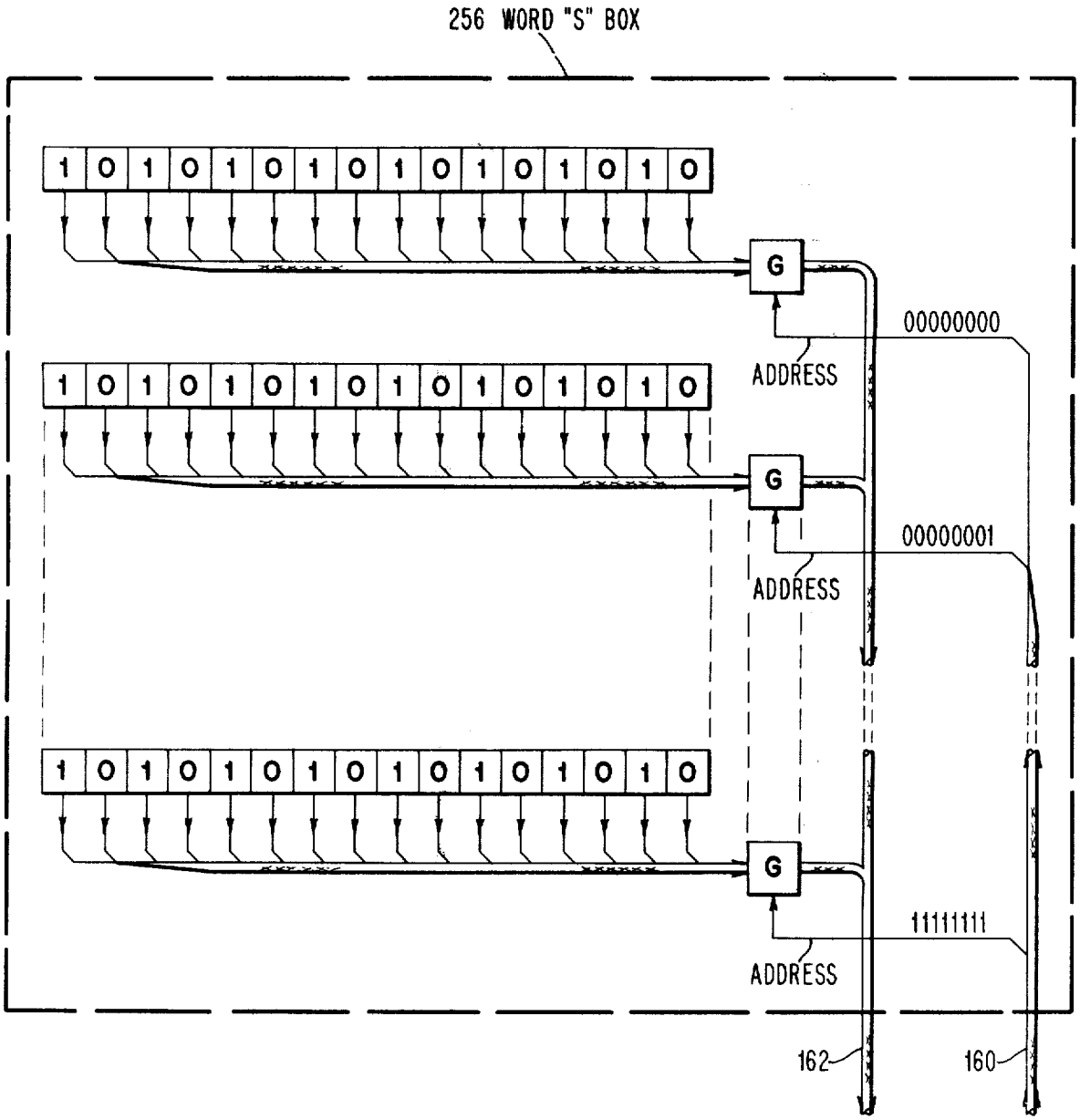
FIG. 6 is a schematic diagram of the 256 word "S" box shown in FIG. 2.

As was shown with regard to FIG. 1, the system contains two non-affine transformation devices 28 and 32. Non-affine transformation device 28 is represented by the 256 word "S" box and non-affine transformation device 32 is represented by the 16 word "S" box. Both of these non-affine transformation devices are substitution devices that transform an n-bit binary word into another n-bit binary word of same dimension, that presents one out of the $2^n$ possibilities of binary numbers that can be contained in the n-bit size word. Both of these substitution devices 28 and 32 are shown schematically in FIGS. 5 and 6 respectively. The 16 word "S" box of FIG. 5 contains 16 words of 4-bit storage. Each word is addressed by one of the 16 wires which are contained in cable 156. The signal values carried on the 16 wires represent a binary number which corresponds to one of the registers which is gated by this binary number. Contained in each register is one out of possible 16 binary words. The input to the 16 word "S" box is a 16-bit binary number which is the output of decoder 157. Decoder 157 receives a 4-bit modulo-16 number from each of the N registers and decodes the 4-bit modulo-2 number into a 16-bit binary number. Then, the 16-bit binary number is substituted in the 16 word "S" box by another 16-bit binary number which is provided as output on cable 156. The 256 word "S" box operates in a very similar manner to that which was described for the 16 word "S" box. The input to the 256 word "S" box is derived from decoder 161 which decodes an 8-bit modulo-256 number as derived from the output of the left-most column of the key matrix as contained in the left-most bit position and in each of the K registers. The decoder 161 decodes the modulo-256 number into a 256-bit binary number which is then used as an address for selecting one out of the 256 registers that corresponds to the specific address and provides a substituted 8-bit number modulo-256 as output on cable 160.

It should be noted, that the substitution devices as described herein are in the form of a stored set of binary words which are addressed and gated in accordance with a decoded number. However, other techniques of performing substitutions or non-affine transformations are available. For example, reference may be made to cross-referenced patent applications.

Now having described the separate components of the system, attention is directed to the operation of the cryptographic system shown in FIG. 2. The priming of the system was previously discussed and will not be repeated at this point. For the purpose of simplicity, it is assumed that the system is fully primed and that the key matrix 10 as represented by the K registers contains a full cipher key. The messages to be enciphered or deciphered is contained in the input buffer shown in FIG. 2A. The cleartext message as represented by the binary bits contained in the input buffer are exclusively ORed with the left-most bit in each of the K registers. The series of eight bits obtained from the left-most bit positions of the K registers represent the left-most column of the key matrix.

A successive chain of exclusive OR operations are executed in generating the cipher bits C1, C2, C3, C4, C5, C6, C7 and C8. Bit C8 represents the ciphertext information that is transmitted. This bit is communicated as output by gate 154 which operates under the control of clock pulse P1. Simultaneous with the generation of cipher bis C1–C8, the next to left-most bit positions in the eight K registers are also added modulo-2 to form the bit identified as N88. The signal appearing on line N88 also appears on line 152 of register N8 at the same time that cipher bits C1–C7 are introduced into the registers N1–N7. It is necessary to substitute the pulse on line N88 for the cipher pulse C8 in generating the feedback signals for controlling the matrix shift control 34. By not utilizing the output cipher text as direct feedback for the matrix shift control 34, an additional measure of security is achieved.

Figure 2C:
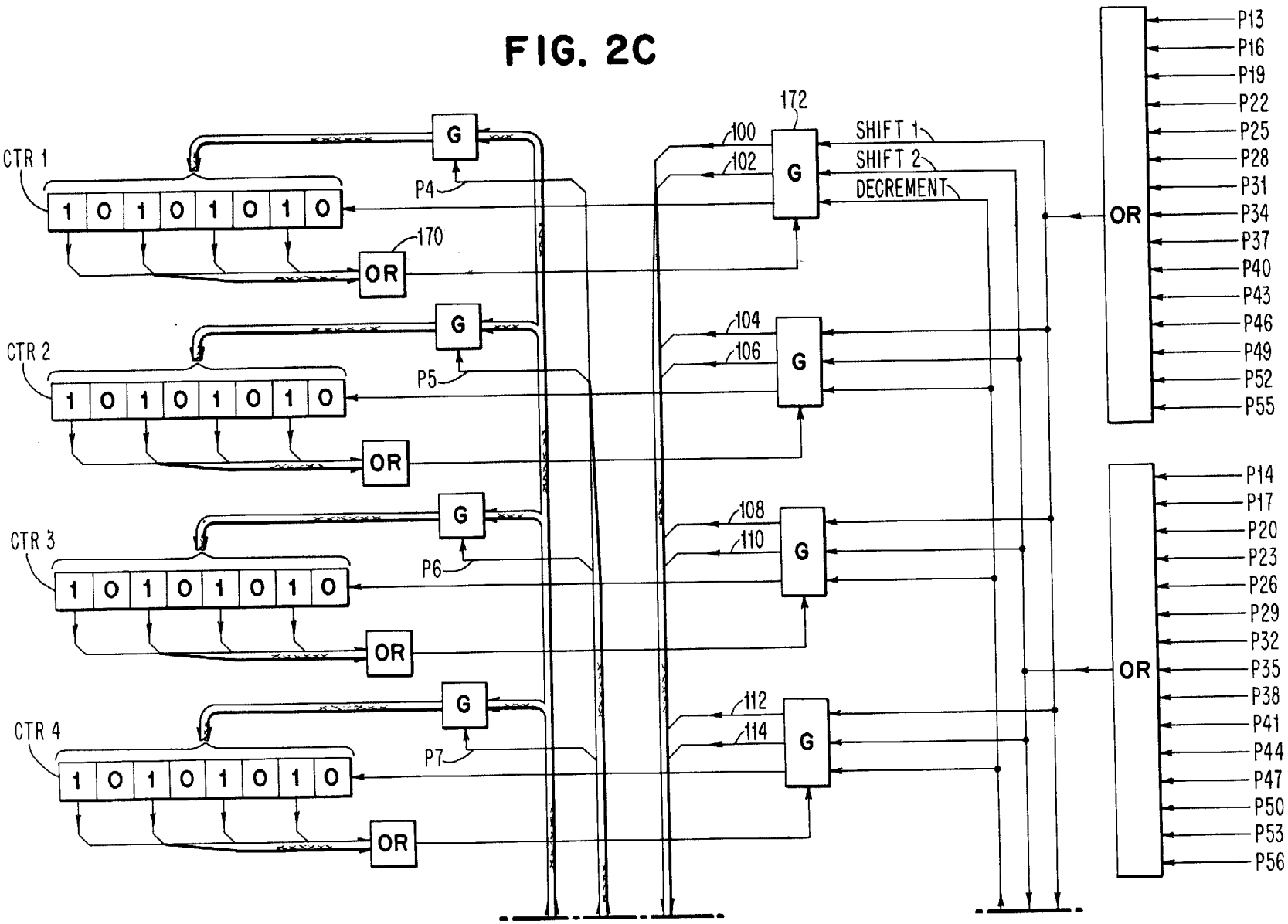
Figure 2D:
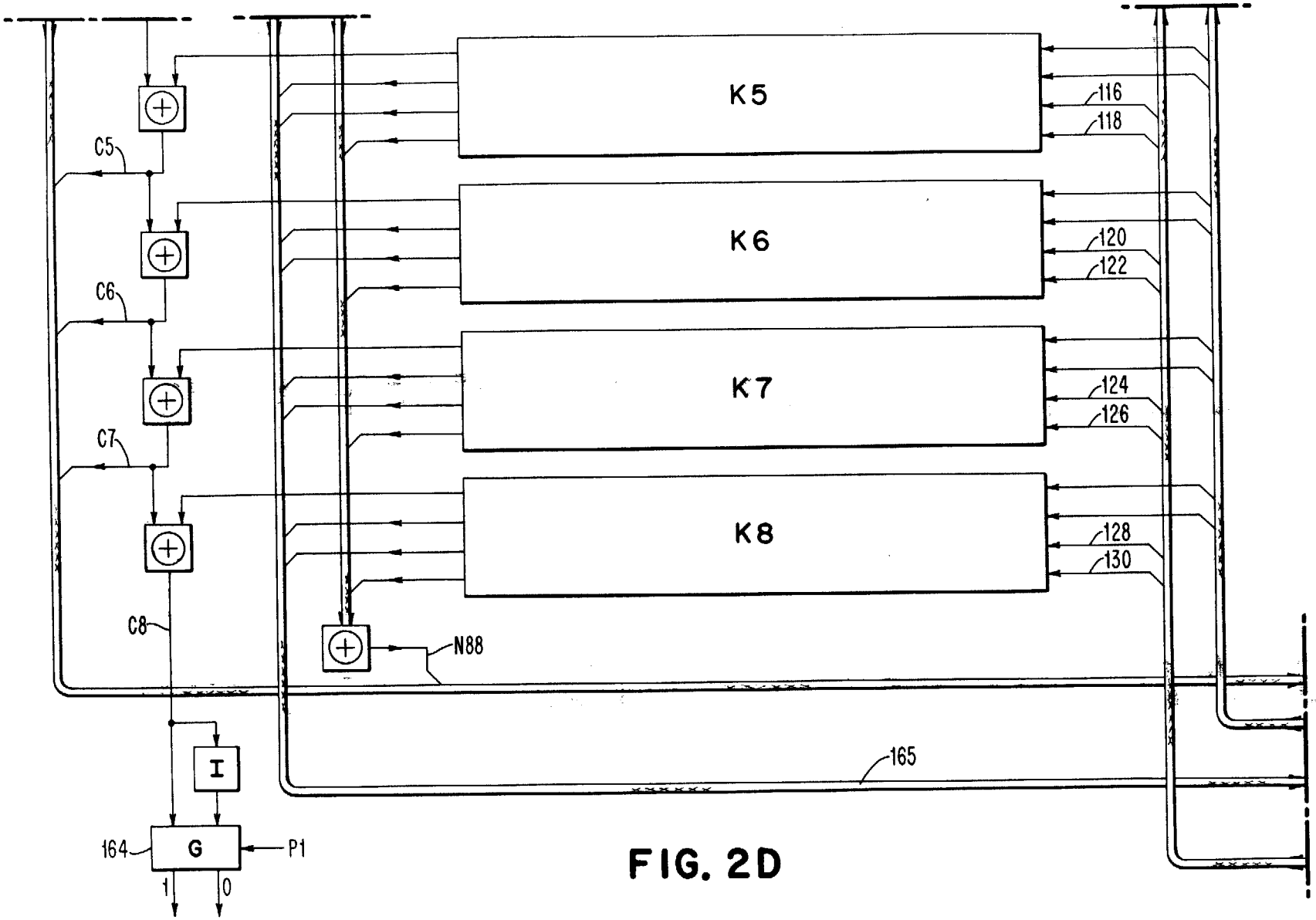
Figure 2E:
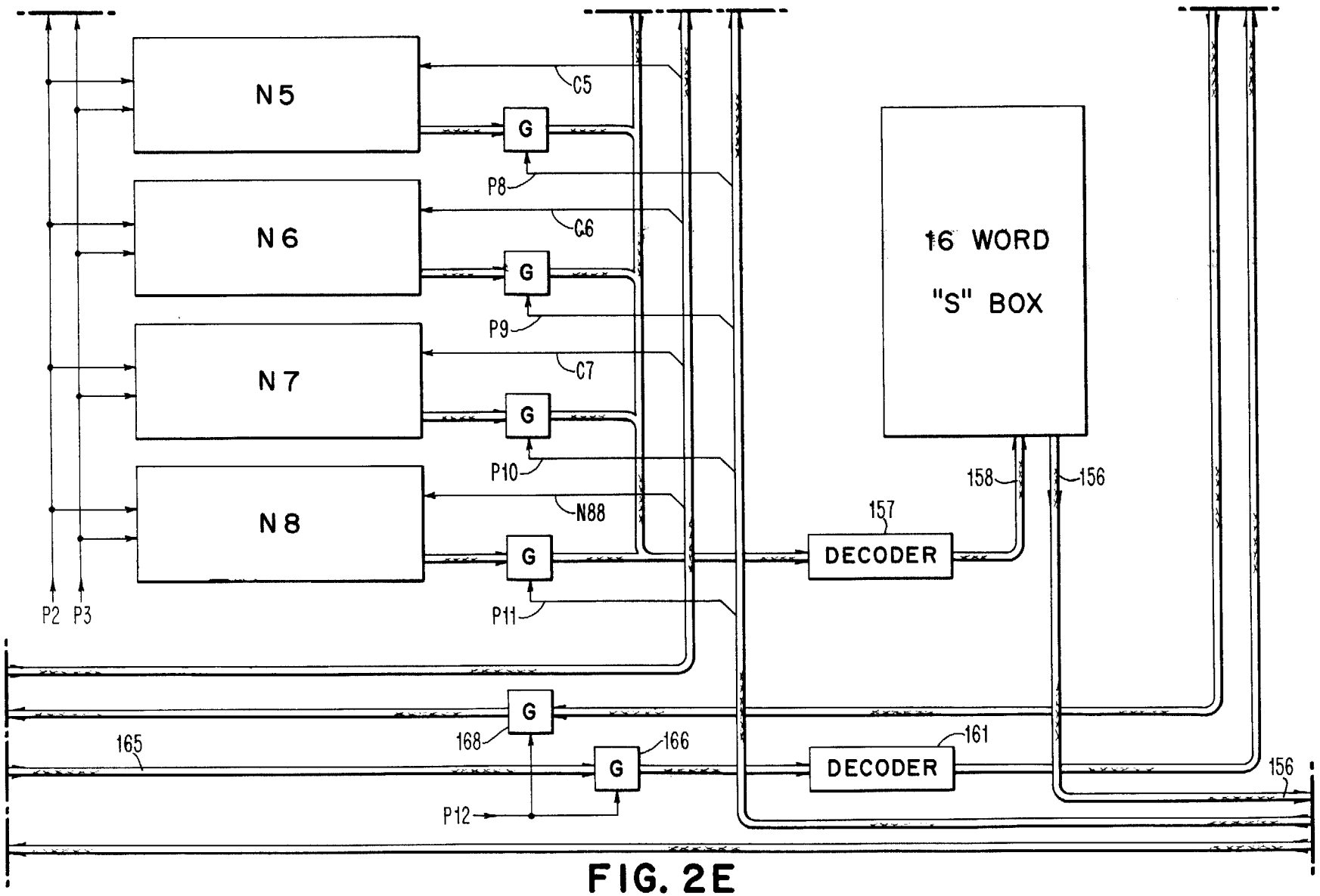

Referring again to the cascaded chain of modulo-2 adders shown in FIGS. 2A and 2D, it is seen that the cipher bit C1–C7 are intermediate products of the successive modulo-2 additions, these cipher bits C1–C7 are fed back to the right-most bit positions in the N registers, N1–N7 respectively. Thus, when clock pulse P2 is applied to the "shift 1" wires of the N registers, the binary vector consisting of the values C1–C7 and the value contained on line N88 is added modulo-2 to the left-most bit of each of the N registers. When the P-3 pulse is applied to the "shift 2" lines of the N registers, the values of C1–C7 and N88 which were previously entered into the N registers are transferred to the right-most bit of the N registers shown in FIGS. 2B and 2E.

Figure 2F:
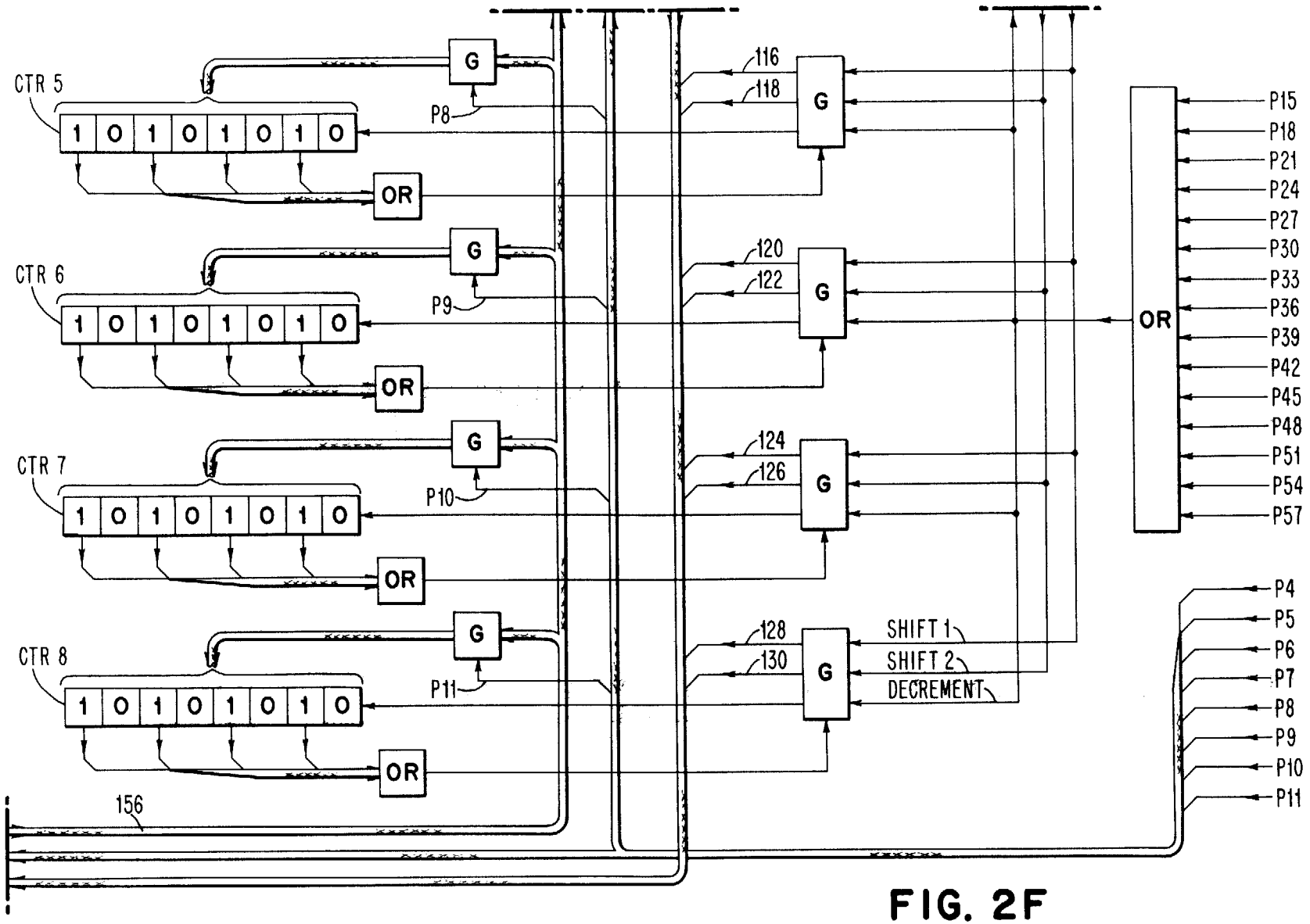

The pulses P4–P11 are used to transfer the contents of the N registers to the counters shown in FIGS. 2C and 2F. These are identified as CTR1, CTR2, CTR3, CTR4, CTR5, CTR6, CTR7 and CTR8. An example of the transfer operation would be the gating of the contents of register N1 is to CTR1. In a similar manner the contents of the remaining seven registers are transferred to their respective counters shown in FIGS. 2C and 2F under the control of clock pulses P-4–P-11. The clock pulses of P-4–P-11 perform the additional function of transferring the contents of each of the N registers to the 16 word "S" box shown in FIG. 5 as an address for executing and substitution. The substituted word which is the output of the sixteen word "S" box is gated to the proper counter shown in FIGS. 2C and 2F.

At this point, the system is prepared to modify the key matrix 10 by replacing the right-most column in the matrix with a binary vector which is a function of the left-most column of the key matrix 10 and the cipher text message. This is accomplished as shown in FIGS. 2A and 2D by outputting the left-most bit positions of each of the K registers along cable 162 to decoder 161 for generating an address to select a substitute word in the 256 word "S" box and outputting the substituted word along cable 160 to the right-most bit positions of each of the K registers. This operation is accomplished under the control of the clock P-12 pulse which is input to gates 166 and 168.

Now having transformed the key matrix 10, the system now performs a matrix shift operation by circulating the information contained in each of the K registers as a function of the contents contained in the N registers. As discussed previously, the contents of the N registers are substituted and stored in the counters CTR1–CTR8. It is the counters CTR1–CTR8 which are then used under the control of clock pulses P-13–P-57 to recirculate the binary bits stored in each of the K shift registers.

The registers K are shifted in parallel as many positions as indicated by their associated counters CTR1–CTR8. Referring to CTR1, at the top of FIG. 2C, it should be noted that the OR circuit 170 continues to provide an output signal to gate 172 until the counter CTR1 contains a binary value zero. The output of the OR gate 170 permits the shift pulses on line 100 and 102 to pass through gate 172 for the purpose of decrementing the counter CTR1. For each decrement of the counter CTR1, the K1 register is shifted one position. When CTR1 has been decremented to zero, OR circuit 170 no longer provides a signal output, and therefore, the shift pulses and the decrement pulse are no longer gated through gate 172. In this manner, the number of shift pulses applied to register K1 is equal to the number that was stored in CTR1. The counters CTR2–CTR8 operate in identical manner as that described with regard to the ocunter CTR1. Thus, the variant key matrix as contained in the registers K1–K8 is scrambled in accordance with contents of counters CTR1–CTR8.

With regard to the control pulses P-1–P-58, reference should be made to TABLE 1 which lists all of the pulses utilized in the system and their respective functions. It should further be noted that clock pulses P-1–P-58 may be provided by conventional clock means.

TABLE 1

| Clock Pulses | Function |
|---|---|
| | P-1 outgate message bit |
| | 2 Shift 1 - N Box |
| | 3 Shift 2 - N Box |
| | 4 Gate N1 to 16 word S Box and gate S Box to CTR1 |
| | 5 Gate N2 to 16 word S Box and gate S Box to CTR2 |
| | 6 Gate N3 to 16 word S Box and gate S Box to CTR3 |
| | 7 Gate N4 to 16 word S Box and gate S Box to CTR4 |
| | 8 Gate N5 to 16 word S Box and gate S Box to CTR5 |
| | 9 Gate N6 to 16 word S Box and gate S Box to CTR6 |
| | 10 Gate N7 to 16 word S Box and gate S Box to CTR7 |
| | 11 Gate N8 to 16 word S Box and gate S Box to CTR8 |
| | 12 Gate K11-K81 vector to 256 word S Box and gate S Box to K15-K85 vector |
| | 13 Shift 1 - K registers |
| 1 | 14 Shift 2 - K registers |
| | 15 Decrement counters |
| | 16 Shift 1 - K registers |
| 2 | 17 Shift 2 - K registers |
| | 18 Decrement counters |
| | 19 Shift 1 - K registers |
| 3 | 20 Shift 2 - K registers |
| | 21 Decrement counters |
| | 22 Shift 1 - K registers |
| 4 | 23 Shift 2 - K registers |
| | 24 Decrement counters |
| | 25 Shift 1 - K registers |
| 5 | 26 Shift 2 - K registers |
| | 27 Decrement counters |
| | 28 Shift 1 - K registers |
| 6 | 29 Shift 2 - K registers |
| | 30 Decrement counters |
| | 31 Shift 1 - K registers |
| 7 | 32 Shift 2 - K registers |
| | 33 Decrement counters |
| | 34 Shift 1 - K registers |
| 8 | 35 Shift 2 - K registers |
| | 36 Decrement counters |
| | 37 Shift 1 - K registers |
| 9 | 38 Shift 2 - K registers |
| | 39 Decrement counters |
| | 40 Shift 1 - K registers |
| 10 | 41 Shift 2 - K registers |
| | 42 Decrement counters |
| | 43 Shift 1 - K registers |
| 11 | 44 Shift 2 - K registers |
| | 45 Decrement counters |
| | 46 Shift 1 - K registers |
| 12 | 47 Shift 2 - K registers |
| | 48 Decrement counters |
| | 49 Shift 1 - K registers |
| 13 | 50 Shift 2 - K registers |
| | 51 Decrement counters |
| | 52 Shift 1 - K registers |
| 14 | 53 Shift 2 - K registers |
| | 54 Decrement counters |
| | 55 Shift 1 - K registers |
| 15 | 56 Shift 2 - K registers |

TABLE 1-continued

| Clock Pulses | Function |
|---|---|
| | 57 Decrement counters |
| | 58 shift input buffer |

While the invention has been described in terms of the exemplary embodiment disclosed herein, it should be recognized by those skilled in the art that alternative embodiments for carrying out the invention are within the skill of the art. For example, while the disclosed embodiment performs a key matrix shifting operation by effectively rearranging each of the rows in the matrix, it is possible to operate on the columns instead of the rows of the matrix or alternatively to transform both the rows and columns. Also, at any point in the above description, where a specific position of a register is accessed, it should be recognized by those skilled in the art that alternative embodiments may be made in which there is variation on which of the specific elements in the register are utilized at any specific time.

It should also be recognized by those skilled in the art that cryptographic techniques in general may be implemented in either "hardware" and "software." That is, the operations performed in ciphering a binary message are easily implemented by a computer program operating on a general purpose computer. For example, the inventive process disclosed herein may be implemented in the form of an APL program. Reference should be made to the following reference manuals for understanding the APL computer program language, APL/360 An Interactive Approach, L. Gilman and A. J. Rose, John Wiley & Sons, Inc., New York, 1970; and APL/360 User's Manual, A. D. Falkoff and K. E. Iverson, IBM, 1968.

An exemplary APL program which can carry out the inventive process is described as follows:

```
                ∇SBIKICK[⎕]∇
∇ C←R SBIKICK F;V;D;G;C1;C2;C3;Z;T;KD;D
[1]     K←?4 32 ρ2
[2]     V←K
[3]     F←'E
[4]     F←(?(8 × R)ρ2,F
[5]     F←F,(,(8ρ2) N ALF PASS)
[6]     KD←(4,(ρF))ρ0
[7]     C←E←0
[8]     D←(4 5)ρ0
[9]     L1:C←C,V[3;0]≠C3←V[2;0]≠C2←V[2;0]≠C1←
        V[0;0]≠F[E]
[10]    KD[;E]←V[;0]
[11]    G←C1,C2,C3,(2| + /V[;1])
[12]    D[;4]←D[;4]≠G
[13]    Z←LTH D←1ϕD
[14]    V[;15]←P ESS V[;15]
[15]    V←(1 + Z)ϕV
[16]    VV←V
[17]    →((ρF)>E←E + 1)/L1
[18]    ⎕←0
[19]    '01'[C]
[20]    ⎕←0
[21]      '01'[KD]
[22]    ⎕←0
[23]∇     '01'[2| + /ϕKD[;ρF]]
```

AUXILIARY FUNCTIONS

```
        ∇CODE[⎕]∇
    ∇ C←CODE;Y
[1]     Y←ALF WRITE
[2]     Y←(8ρ2) N Y
[3]     C←'01'[,Y]
    ∇
```

-continued

```
        ∇DECODE[⎕]∇
    ∇ Z←DECODE C;Y
[1]     Y←'01' C
[2]     Y←(( ((ρY) ÷ 8);8)ρY)
[3]     Y←(8ρ2] B Y
[4]     Z←ALFN[Y]
    ∇
        ∇WRITE[⎕]∇
    ∇ TEXT←WRITE
[1]     TEXT←0
[2]     →(2 3)[Δ/')END' = 4ρ¯5 ↑ TEXT←TEXT, ,ALF[64]]
[3]     TEXT←¯5 ↓ TEXT
    ∇
        ∇N[⎕]∇
    ∇ E←V N A;IR1
[1]     E←(((ρA),ρV)ρV)|A°. ÷ ((1 ↓ V) . *IR1° ≥ TR1 .
        −1 + ρV),1
[2]     THIS FUNCTION IS IDENTICAL TO THE
        OPERATOR EXCEPT THAT IT CAN TAKE
        A VECTOR RIGHT ARGUMENT
    ∇
        ∇B[⎕]∇
    ∇ E←V B A;IR1
[1]     E←A + . × ((1 ↓ V) × .*IR1°.≥IR1←¯1 + ρV),1
[2]     THIS FUNCTION IS INDENTCAL TO THE
        OPERATOR ⊥ EXCEPT THAT IT CAN TAKE
        A MATRIX RIGHT ARGUMENT
    ∇
        ∇ESS[⎕]∇
    ∇ C←P ESS M;U
[1]     U←LTH M
[2]     C←P[U]
[3]     C←HTLI C
    ∇
        ∇LTH[⎕]∇
    ∇ N←LTH A
[1]     N←A + . × ϕ 2* ¯1 ↑ (ρA)
    ∇
        ∇HTLI[⎕]∇
    ∇ B←HTLI V
[1]     B←2| V°. ÷ ϕ2* ( 2 . ρP)
```

In order to make the above program more easily understood, the above program is described by the following functions.

[1] Specifies the basic key as being a 4 by 32 matrix of 128 binary digits, although more or fewer rows and columns could be used.

[2] Specifies V as being like K. This is needed because V will be modified by the program.

[3] Deliteralizes the input message F. This is necessary if the input function is "CODE."

[4] This type of system requires a priming operation. This statement precedes F by R randomly selected bytes, different for each message.

[5] Catenates at the end of F the verifier "PASS." PASS is a variable which can be specified to be anything. ALF is the complete APL keyboard alphabet.

[6] Creates an array of 4 by ρ F zeros, to later display the actual key matrix as used.

[7] Sets C and E=0. E is a counter, C serves as a zero for cateration.

[8] Creates a 4 by 5 zero array, to be filled in a nonsystematic manner as a function of messages and key to provide the kicking information.

[9] Specifies column 0 (i.e., initially E=0) of the key matrix and adds digit in row 0 to the first digit of F, this being part of the first random bytes. The resulting digit is added mod 2 to the key digit in the second row, etc.

[10] Respecifies column E of display KD with key column 0 as actually used, for later display, if desired.

[11] Forms binary vector G from C1, C2, C3 and the sum mod 2 of the digits in column 1 of key matrix. This is the information to be used to kick the rows of the key matrix.

[12] Respecifies D with G.

[13] Shifts columns of D by one step and converts binary array into four numerals base 32.

[14] ESS is a substitution ("S"), the point permutation being specified by P. This substitution is now used to replace column 15 (or any other column) of key matrix by its S substitute.

[15] Takes vector 1+z and uses its components to kick rows of matrix V.

[16] Is a spacer.

[17] Is the counter.

[18] Is a spacer.

[19] Displays the cipher.

[20] Is a spacer.

[21] Displays the actual key matrix used.

[22] Is a spacer.

[23] Displays the sum mod 2 of all the columns of KD.

What is claimed is:

1. A variant key cryptographic system comprising:

input means for introducing a plurality of electrical signals in binary form as message information to be enciphered or deciphered;

priming means for presenting a plurality of random binary signals to said input means to initialize the system prior to introducing message information thereto, matrix storage means for arranging a cipher key in an n×m matrix array, wherein m and n are greater than 1;

a plurality of modulo-two adders interconnected with each other for adding selected elements from said matrix with binary signals obtained from said input means;

feedback means connected to said plurality of modulo-two adders;

non-affine transformation means connected to said feedback means for transforming the feedback signals present on the lines contained in said feedback means;

shift control means connected to said non-affine transformation means for rearranging selected matrix elements within said n×m matrix array.

2. The system as defined in claim 1 wherein said plurality of modulo-two adders are arranged in a cascaded fashion.

3. The system as defined in claim 2 wherein said priming means is an external source of random binary signals.

4. The system as defined in claim 2 wherein said feedback means further comprises a plurality of lines connected to intermediate stages of said modulo-two adders and at least one line connected to an element within said matrix which element is also connected to one of said plurality of modulo-two adders.

5. The system as defined in claim 4 wherein said non-affine tranformation means is a substitution device.

6. The system as defined in claim 5 wherein said substitution device comprises coding-decoding means for converting from one base number to another base number.

7. The system as defined in claim 6 wherein said matrix consists of a plurality of shift registers each capable of shifting information within the register for rearranging a column or row of the matrix;

shift control output means for specifying the number of shifts that are to be executed by each of said plurality of shift registers.

8. A variant key cryptographic system comprising:

input means for introducing a plurality of electrical signals in binary form as message information to be enciphered or deciphered;

priming means for presenting a plurality of pseudo-random binary signals to the input means to initialize the system prior to introducing message information thereto, matrix storage means for arranging a cipher key in an n×m matrix array wherein m and n are greater than 1;

a plurality of modulo-two adders interconnected with each other for adding selected elements from said matrix with binary signals obtained from said input means;

feedback means connected to said plurality of modulo-two adders;

first non-affine transformation means connected to said feedback means for transforming the feedback signals present on the lines contained in said feedback means;

shift control means connected to said first non-affine transformation means for rearranging selected matrix elements within said n×m matrix array;

second feedback means connected to selected elements of said matrix for providing a binary word to a second non-affine transformation means;

said second non-affine transformation means generating a variant binary vector that is stored in selected elements within the key matrix.

9. The system as defined in claim 8 wherein said second non-affine transformation means is a substitution device.

*10. A variant key cryptographic system comprising:*

*means for introducing a plurality of electrical signals in binary form as message information to be enciphered or deciphered;*

*priming means for presenting a plurality of random binary signals to said input means to initialize the system prior to introducing message information thereto,*

*means for storing and rearranging a cipher key,*

*a plurality of modulo-two adders interconnected with each other for adding selected elements from said storage means with binary signals obtained from said input means;*

*feedback means connected to said plurality of modulo-two adders;*

*non-affine transformation means connected to said feedback means for transforming the feedback signals present on the lines contained in said feedback means;*

*control means connected to said non-affine transformation means for rearranging selected elements within said storage means.*

*11. A variant key cryptographic system comprising;*

*input means for introducing a plurality of electrical signals in binary form as message information to be enciphered or deciphered;*

*priming means for presenting a plurality of pseudo-random binary signals to the input means to initialize the system prior to introducing message information thereto,*

*storage means for storing and rearranging a cipher key;*

*a plurality of modulo-two adders interconnected with each other for adding selected elements from said storage means with binary signals obtained from said input means;*

*feedback means connected to said plurality of modulo-two adders;*

*first non-affine transformation means connected to said feedback means for transforming the feedback signals present on the lines contained in said feedback means;*

*control means connected to said first non-affine transformation means for rearranging selected elements within said key storage means;*

*second feedback means connected to selected elements of said storage means for providing a binary word to a second non-affine transformation means;*

*said second non-affine transformation means generating a variant binary vector that is stored in selected elements within the key storage means.*

* * * * *